United States Patent
Agrawal et al.

(10) Patent No.: US 7,543,045 B1
(45) Date of Patent: Jun. 2, 2009

(54) SYSTEM AND METHOD FOR ESTIMATING THE GEOGRAPHICAL LOCATION AND PROXIMITY OF NETWORK DEVICES AND THEIR DIRECTLY CONNECTED NEIGHBORS

(75) Inventors: Dakshi Agrawal, Monsey, NY (US);
Matthew E. Duggan, Chertsey (GB);
Daniel J. Martin, Pawling, NY (US);
Vasileios Pappas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,209

(22) Filed: May 28, 2008

(51) Int. Cl.
*G06F 15/177* (2006.01)
*G06F 15/173* (2006.01)
*G06F 15/16* (2006.01)
*H04W 4/00* (2006.01)
*H04L 12/28* (2006.01)
*G05B 19/418* (2006.01)

(52) U.S. Cl. .................. 709/220; 709/224; 709/226; 709/200; 370/338; 370/389; 455/456.1; 705/8

(58) Field of Classification Search ............... 709/220, 709/200, 224, 226; 370/338, 389; 455/456.1; 705/8
See application file for complete search history.

(56) References Cited

U.S. PATENT DOCUMENTS

| | | | |
|---|---|---|---|
| 6,684,250 B2 | 1/2004 | Anderson et al. | |
| 6,947,978 B2 | 9/2005 | Huffman et al. | |
| 7,262,733 B2 | 8/2007 | Dooley | |
| 7,295,556 B2 | 11/2007 | Roese et al. | |
| 2007/0041335 A1* | 2/2007 | Znamova et al. ............ 370/254 |

* cited by examiner

Primary Examiner—Philip C Lee
(74) Attorney, Agent, or Firm—Cantor Colburn LLP; Joe Jones

(57) ABSTRACT

A method for estimating locations of devices in a network, the method including: identifying each of the devices; inputting an approximate location of at least one of the devices; constructing a constrain for each of the devices, the constrain comprising at least one of a type of connectivity of the device and a technology characteristic related to the device; deriving an optimization criterion on a location for each of the devices, the criterion assigning a positive weight to each constrain that is satisfied by at least one of an estimated location and the approximate location and assigning a negative weight to each constrain that is not satisfied by at least one of the estimated location and the approximate location; calculating a best fit location for each of the devices that maximizes the optimization criterion; presenting the best fit location for each of the devices to a user, the user either accepting or rejecting each best fit location, the user providing additional information for constructing each constrain associated with a rejected best fit location; and iterating at least one of the identifying, the inputting, the constructing, the deriving, the calculating, and the presenting using the additional information until the user accepts each best fit location.

1 Claim, 4 Drawing Sheets

US 7,543,045 B1

SYSTEM AND METHOD FOR ESTIMATING THE GEOGRAPHICAL LOCATION AND PROXIMITY OF NETWORK DEVICES AND THEIR DIRECTLY CONNECTED NEIGHBORS

BACKGROUND OF THE INVENTION

1. Field of the Invention

The present invention relates to network and system management. More specifically, the invention relates to a computer-implemented method and system that can identify the geographic location of a device by using information for various networking technologies.

2. Description of the Related Art

It is important for an operator of a network to be able to locate the resources that make up the network. The operator needs to know the location of each resource in order to provide planning, upgrades, inventory control, troubleshooting, or repairs for example.

It can be a challenge for users of network management applications to determine a geographic location for each resource of the network they manage. A number of data intensive techniques can be used to identify the location of a resource. One disadvantage of the data intensive techniques is that these techniques depend on accurate data. It can be expensive to maintain the data and if the data is not maintained, then the techniques can be prone to error. For example, the user may employ a geo-coding technique to determine the location of a device based on a configured Internet Protocol (IP) address. However, the location returned by the technique may be inaccurate due to an outdated database. In this case, the user may have to override the geo-coded location with more accurate information.

A further challenge for users of network management applications is that although some devices in the network may be automatically located using the data intensive techniques, other devices connected to the located devices may not be located due to a lack of available information or inaccurate information.

Therefore, what are needed are techniques for determining a geographic location of a resource in a network or system without relying solely on an existing database.

SUMMARY OF THE INVENTION

The shortcomings of the prior art are overcome and additional advantages are provided through the provision of a method for estimating locations of devices in a network, the method including: identifying each of the devices; inputting an approximate location of at least one of the devices; constructing a constrain for each of the devices, the constrain comprising at least one of a type of connectivity of the device and a technology characteristic related to the device; deriving an optimization criterion on a location for each of the devices, the criterion assigning a positive weight to each constrain that is satisfied by at least one of an estimated location and the approximate location and assigning a negative weight to each constrain that is not satisfied by at least one of the estimated location and the approximate location; calculating a best fit location for each of the devices that maximizes the optimization criterion; presenting the best fit location for each of the devices to a user, the user either accepting or rejecting each best fit location, the user providing additional information for constructing each constrain associated with a rejected best fit location; and iterating at least one of the identifying, the inputting, the constructing, the deriving, the calculating, and the presenting using the additional information until the user accepts each best fit location.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution to the problem of determining a geographic location of resources or devices in a network. A method is provided for estimating a geographic location of each device in the network. The method may be implemented in a network management application and provide increased capability.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, wherein like elements are numbered alike, in which:

Figure 1:
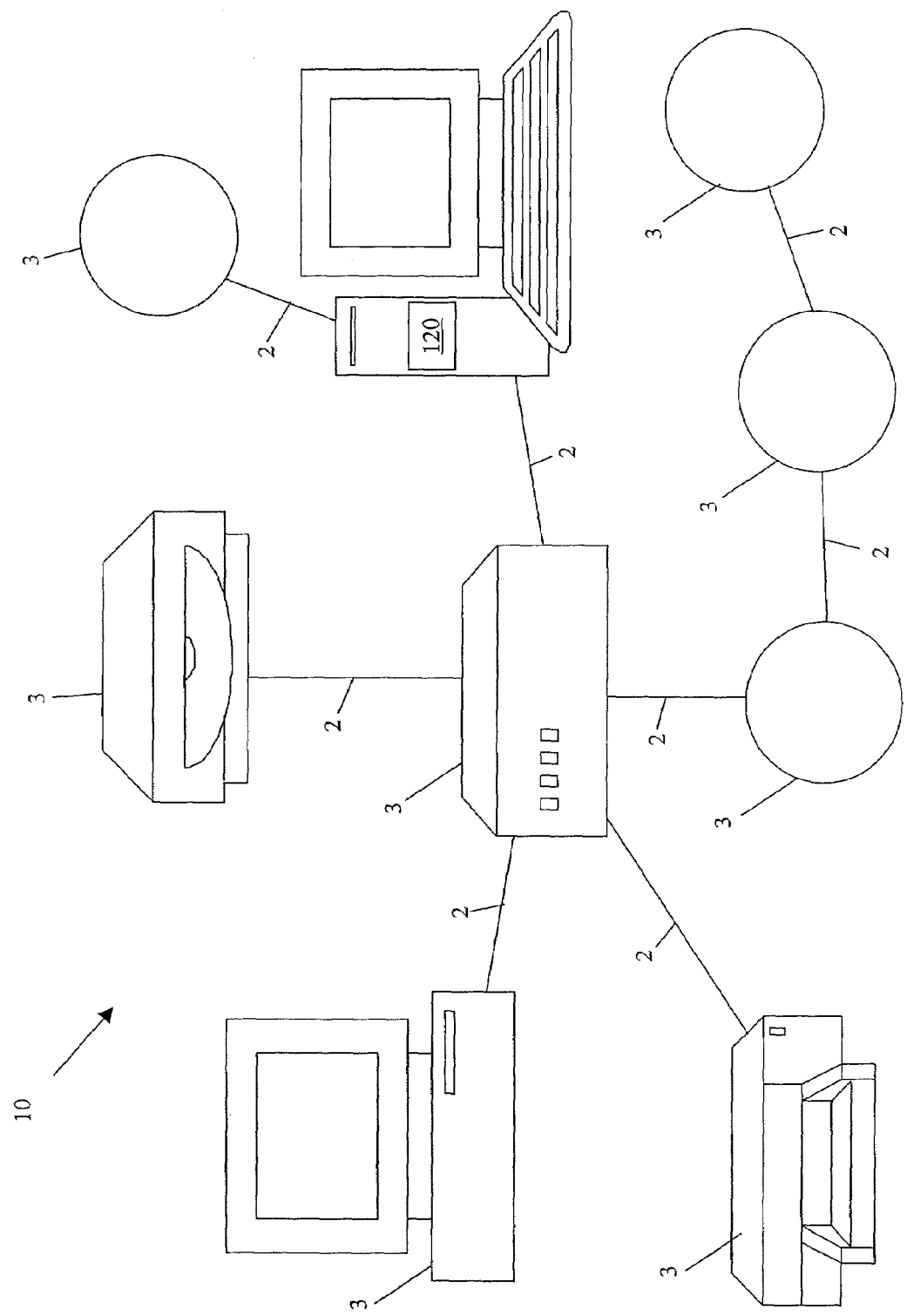
FIG. 1 illustrates an exemplary embodiment of a network.

The detailed description explains the preferred embodiments of the invention, together with advantages and features, by way of example with reference to the drawings.

DETAILED DESCRIPTION OF THE INVENTION

Disclosed are techniques for estimating a location of a resource in a managed network. The techniques enable a user to estimate the location through the use of a number of sub-techniques that individually may produce inaccurate results. The techniques, which include methods and apparatus, use "constrained optimization" to overcome the inaccuracies of the sub-techniques.

In the constrained optimization disclosed herein, constraints are imposed by various characteristics of a particular technology. For example, Synchronous Optical Network (SONET) links are generally long haul links while Ethernet links are generally used for a short haul. Thus, a resource linked with a SONET can be presumed to be located a long distance from another resource linked with the SONET. Constrained optimization produces a "best fit" of the geographic locations while maximizing adherence to the constraints.

In one embodiment, the constrained optimization is based on "Fuzzy Logic" and is referred to as fuzzy optimization. Fuzzy optimization is used to manipulate vague concepts. In fuzzy optimization, fuzzy sets are generally used for modeling the constraints. For example, as discussed above, the SONET link is generally used for the long haul. But "long haul" is not precisely defined. Fuzzy logic can model whether the long haul is on a shorter side or a longer side and, thus, provide a more accurate estimate of location. The fuzzy optimization problem can be defined as simultaneously satisfying the constraints and a goal such as estimating the location of the resource. In one embodiment, a fuzzy optimization processor can generate locations of each of the network resources using as inputs (1) known characteristics of the technologies related to the network resources and (2) a topology of the network resources.

Examples of the sub-techniques that can estimate the location of a device without taking into consideration its connectivity include the following:
1) Use of GPS (Global Positioning System) hardware, which allows the user to determine the latitude and longitude of the location where a resource is deployed.
2) Use of geo-coding and reverse geo-coding techniques that can resolve data such as postal addresses and IP addresses to latitudes and longitudes and vice-versa.
3) Use of external databases, spreadsheets or files to resolve the location of a network resource based on some attribute of the resource, such as IP address or name.
4) Use of location information stored in the resource itself, such as SNMP (Simple Network Management Protocol) sysLocation data or interface descriptor data, which reveal the location of the connected resource.
5) Use of DNS LOC (location) records that allow hostnames and IP addresses to be resolved to a latitude and longitude.
6) Any combination of the above sub-techniques.

For convenience, certain definitions are provided. The terms "resource" and "device" related to devices interconnected in a network and are used interchangeably herein. The term "constrain" relates to a constraint that is input to a constrained optimization algorithm. The term "connectivity" relates to a method or topology used to link resources or devices in a network. The term "containment" relates to one network device included in another network device.

Turning now to FIG. 1, an exemplary embodiment of a network 10 is illustrated. The network 10 includes links 2 connecting resources referred to as devices 3. The devices 3 can include any device generally used in a network. Non-limiting examples of the devices 3 include a computer processing system, memory, input devices such as a keyboard or mouse, output devices such as a display or printer, interfaces, switches, and communication devices.

Figure 2:
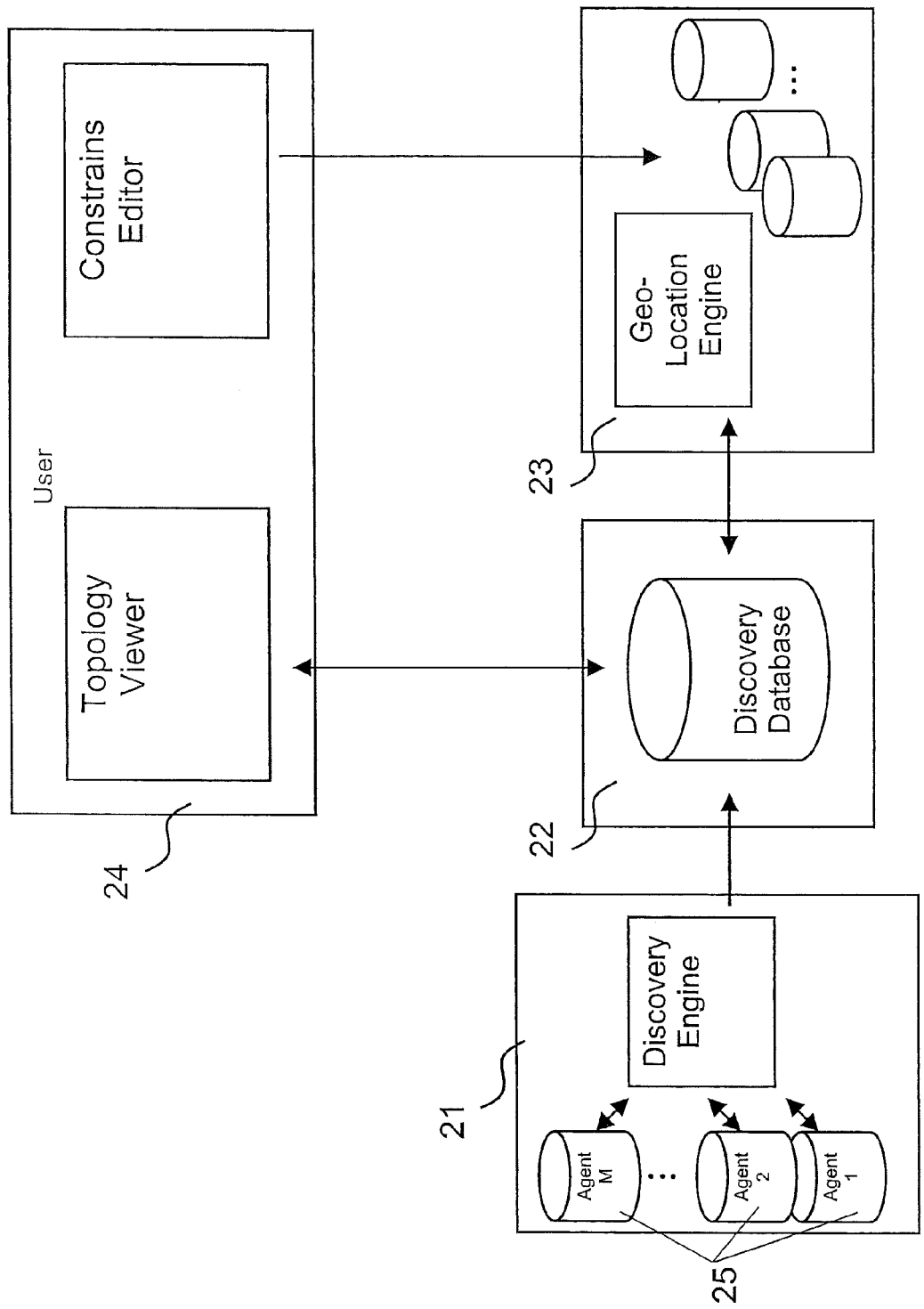
FIG. 2 illustrates an exemplary embodiment of a resource locator system.

Turning now to FIG. 2, an exemplary embodiment of a resource locator system 20 is depicted. The system 20 includes a discovery engine 21 that uses multiple agents 25 that discover the devices 3 that make up the network 10. The discovery engine 21 also discovers the relationships between the devices 3 such as connectivity or containment. FIG. 2 also depicts a discovery database 22 that stores information discovered by the discovery engine 21. A geo-location engine 23 takes as input the information from the discovery database 22 and a set of predefined rules about technology specific constrains. Using the inputs, the geo-location engine 23 generates at least one constrain for each device 3 and produces a best fit for the locations of the devices 3. A user interface 24, also depicted on FIG. 2, displays a topology of the network 10 and the location of each device 3. Optionally, the user interface 24 can provide an editor where a user can input new rules for technology specific constrains.

Figure 3:
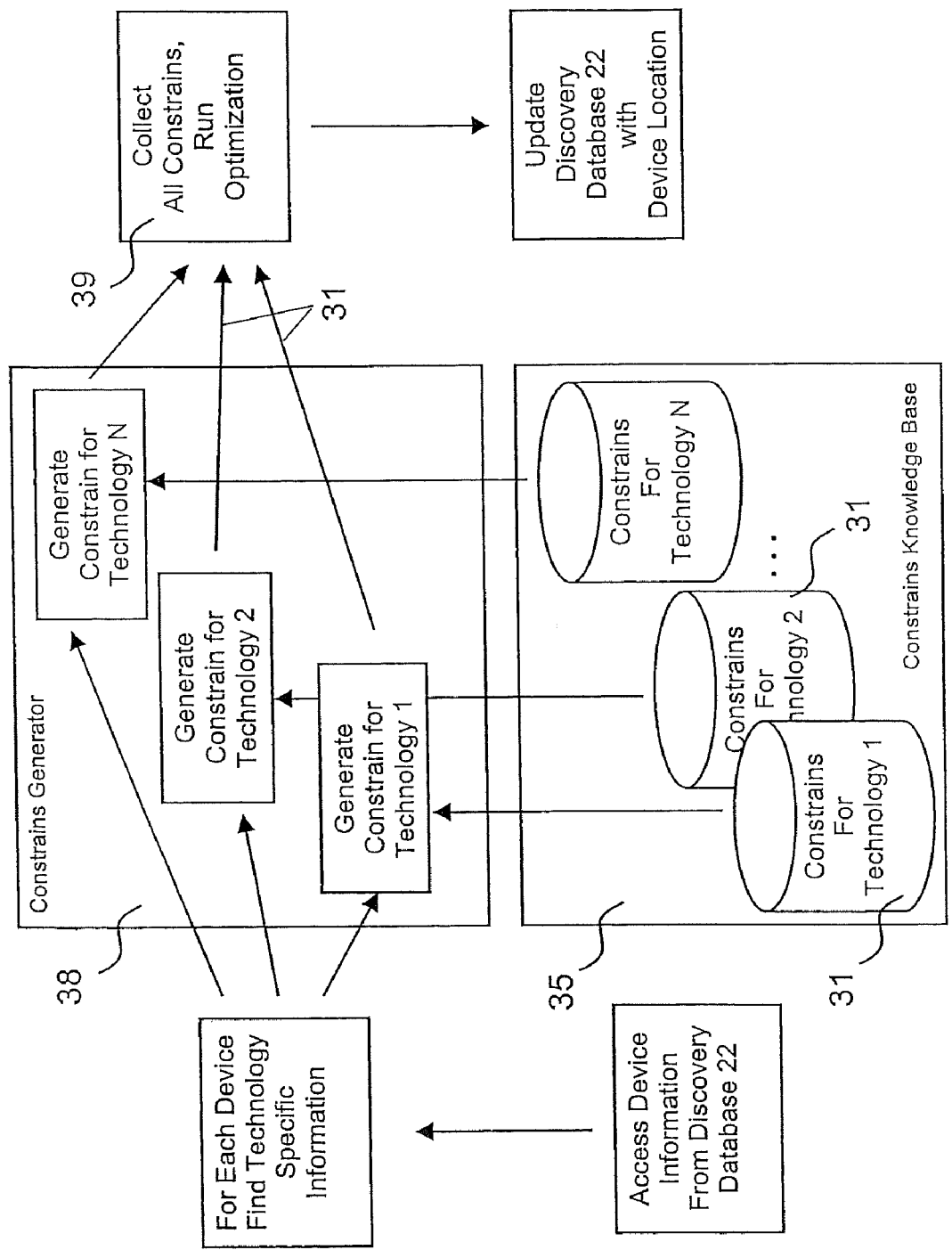
FIG. 3 illustrates an exemplary embodiment of a geo-locator engine included in the resource locator system.

FIG. 3 depicts the geo-location engine 23 in more detail. Referring to FIG. 3, a knowledge database 35 stores the rules used to create the technology specific constraints. A constrains generator 38 takes as input information from the discovery database 22 and the knowledge database 35 and produces constrains 31. An optimization processor 39 receives the constrains 31 and runs a fuzzy optimization algorithm that produces the locations of the devices 3. The fuzzy optimization program satisfies the constrains 31 to produce the locations.

Figure 4:
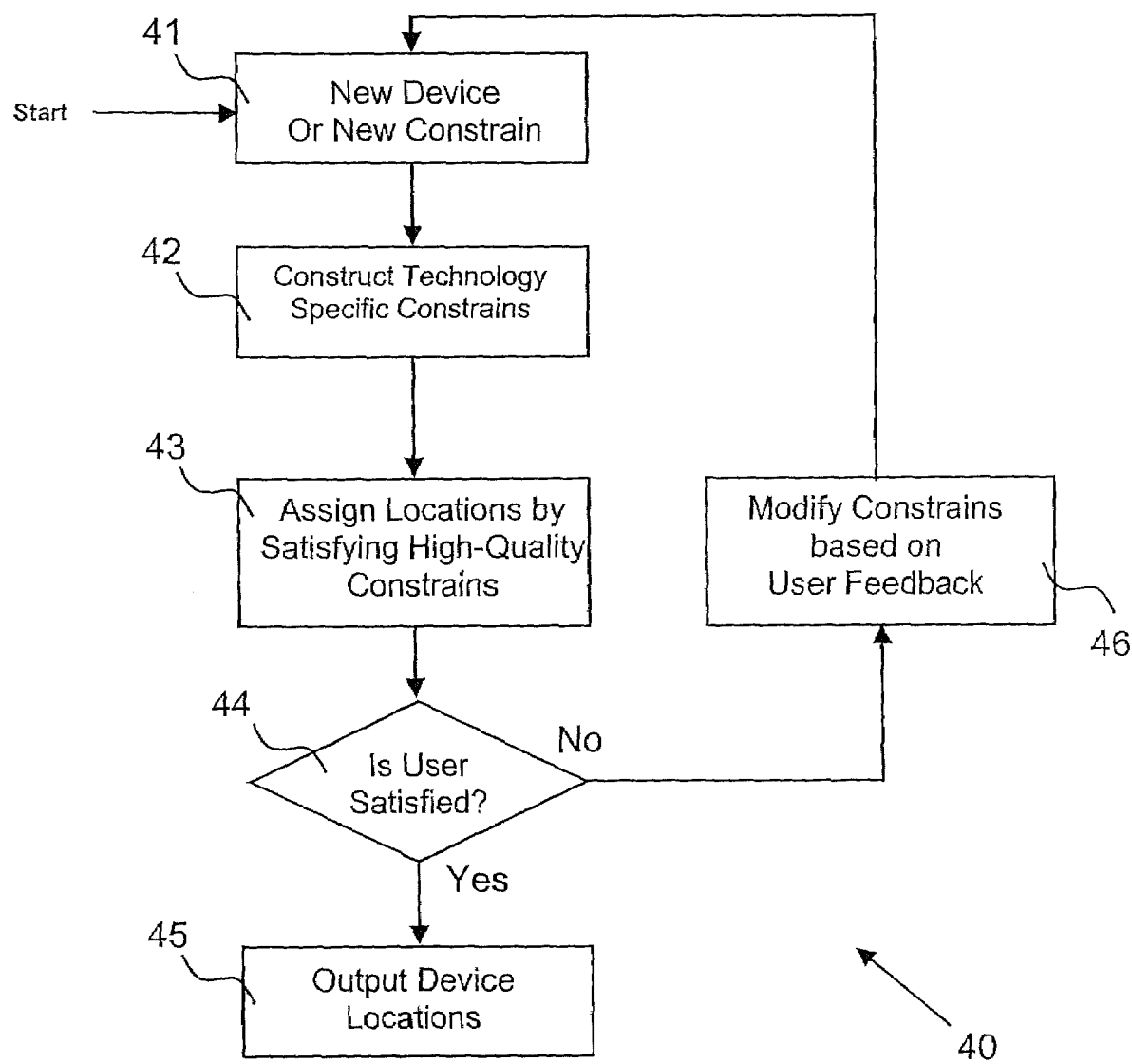
FIG. 4 presents one example of a method for estimating a location of a device in the network.

FIG. 4 presents one example of a method 40 for estimating locations of the devices 3 in the network 10. The method 40 calls for (step 41) querying the network 10 to identify the devices 3 using the discovery engine 21. Step 41 includes querying the devices 3 to identify their physical composition. The physical composition can be in terms of ports, cards, slots in a nest, and the like. Step 41 also includes retrieving information about the configuration of each device 3, such as IP addresses, Media Access Control (MAC) address, Ethernet Hardware address, naming and the like. Step 41 also includes determining which IP addresses can be geocoded in the absence of Global Positioning System (GPS) hardware and DNS LOC (Domain Name System location) records. For each IP address that can be geocoded, the resource locator system 20 makes use of an appropriate technique, such as an API call (Application Programming Interface call). Step 41 can also include inputting an approximate location of at least one of the devices 3.

Further, the method 40 calls for (step 42) constructing technology specific constrains for the devices 3 for which the discovery engine 21 cannot identify a location. In addition, step 42 includes constructing the technology specific constrains for the devices 3, which have potentially inaccurate location information. Step 42 is performed by the geo-location engine 23 using information from the discovery database 22. Step 42 also includes storing the constructed constrains in the knowledge database 35. In addition, step 42 includes the option of the user adding to, modifying, or deleting the technology specific rules in the knowledge database 35 using the user interface 24. Further, step 42 includes defining a geographical set that has an area of proximity based on a known location for at least one device 3 and the connectivity characteristics for each device 3 in the area. All the devices 3 can be assigned to geographical sets by using information about the area of proximity and the connectivity in addition to the information available from the sub-techniques discussed above. Techniques for assigning the devices 3 to geographical sets generally provide "fuzzy hints" (i.e., the device 3 is within 100 meters of another device 3, the device 3 is likely to be in the same rack as another device 3).

Further, the method 40 calls for (step 43) calculating a location for each device 3. The calculated location is referred as a best fit location. Step 43 is performed by optimizing a fit function that uses the geographical sets as input. Non-limiting examples of techniques for optimizing the fit function include hierarchical clustering algorithms, decision tree algorithms, Bayesian networks inference algorithms, fuzzy sets, simulated annealing techniques, and genetic algorithms. Step 43 can also include deriving an optimization criterion used for calculating a location for the device 3, the criterion assigning a positive weight to each constrain that is satisfied by at least one of an estimated location and the approximate location entered in step 41 and assigning a negative weight for each constrain that is not satisfied by at least one of the estimated location and the approximate location. That is to say, estimated locations that satisfy more constrains are rewarded by the optimization algorithm while estimated locations that do not satisfy many constrains are penalized. The best fit location calculated for each device 3 maximizes the optimization criterion.

Further, the method 40 calls for (step 44) presenting the best fit location to a user. The user can either accept the location or reject the location. If the user rejects the best fit location, then the user can provide additional information (step 46) for constructing the constrain. After the user enters the additional information, steps 41-44 can be repeated (i.e., iterated) until the user accepts the best fit location. As an example of the additional information, the user can reassign the geographical location of a device 3 in the geographical set to a new address or latitude and longitude. Based on learnt topology and connectivity characteristics, the resource locator system 20 can reassign the geographical locations of the devices 3 in the geographical set. Alternatively, the user may provide all valid locations for the geographical sets (i.e., the geographic locations of all buildings where network devices 3 are deployed), and the geographical sets are automatically assigned to the provided locations based upon a best-fit algorithm.

If the user accepts the best fit location, then the best fit location is output as an accepted location (step 45). Accepted locations may be cached so that subsequent network discoveries do not need to use the method 40, which may be provided as a geocoding service with a per-query charge.

With respect to step 42, various rules can be used to construct the technology specific constrains. Six examples of rules are presented. In the first rule, the interface type information can be used in order to qualitatively gauge the proximity of two devices. For example, if 100BASE-TX UTP Ethernet connections are used, it is determined that the associated devices 3 must be within about 100 meters from each other based on guidelines (optionally, users can specify their own cable length specifications). In this case, the algorithm will place the two devices 3 in close proximity with each other. In contrast, if the interface type is POS (packet over SONET) or other similar type of WAN (wide area network) interface then the two connected devices 3 are most probably positioned far apart (potentially in different buildings).

In a second rule, the network architecture characteristics can be used in order to gauge the proximity of two or more devices. For example, devices located in a POP (Point Of Presence) or an IXP (Internet exchange point) are interconnected in a much different way that devices that form the backbone of a WAN. For instance many devices 3 in POPs are configured with redundancy in mind, and thus symmetrical architectures or the use of redundancy protocols such as HSRP (Hot Standby Router Protocol) can be indicative of device 3 proximity. In addition, devices 3 in POPs or IXPs usually tend to have a high degree of connectivity. In contrast, devices 3 forming the backbone of a WAN are usually either sparsely connected or almost fully connected with the use of MPLS (Multiprotocol Label Switching) or ATM (Asynchronous Transfer Mode) virtual paths. In addition, e model characteristics of the device 3 are usually indicative of the role of the device 3 in the network 10. For example, the Cisco 7600 series routers are most probably used for forming the WAN, while 6500 series are most probably used inside a POP.

In a third rule, routing protocol configuration information can be used in order to gauge the proximity of two of more devices 3. For example, the OSPF (open shortest path first) 0 area numbers can be indicative that all the participating devices 3 form the backbone of the network, while other area codes can be indicative that devices 3 are confined in smaller geographical areas. Similarly, a full BGP (border gateway protocol) mesh can be indicative that the devices 3 that are participating peers are scattered across the backbone of the network, while all the devices 3 that are BGP clients of the same reflector are most probably placed in the same geographical area. In addition, if a device 3 managed by the customer has an eBGP (external border gateway protocol) peering session with the devices 3 that are not managed by the user (such as to facilitate peering agreements), then the devices 3 are highly likely to be directly connected at an IXP facility. In this instance, the resource locator system 20 can estimate the location of a device 3 that peers with but is not managed by the user of the application.

In a fourth rule, actual measurements of round-trip times (RTTs) between devices 3 can be used in order to estimate the actual distance between the devices 3. Note that network distance does not usually reflect the actual geographical distance between devices 3 in multihop paths. In contrast, measured RTTs between directly connected devices 3 can serve as a good estimation of the geographical distance between the directly connected devices 3.

In a fifth rule, if the physical location and address of the device 3 can be determined, this information can be used in conjunction with meta-data to further assist in the estimate of the physical location of connected devices 3 for which a location cannot be determined. For instance, assume that the location and address of a router 3 is determined. Supporting meta-data for the location/address can be used to identify that the location is an IXP and, as a result, a number of characteristics can be used to further assist with the estimation of connected devices 3. For instance, the IXP is highly likely to facilitate service provider peering.

In a sixth rule, the location for some of the devices 3 can be located with the use of wireless signal identifiers such as RFID (Radio Frequency Identification Device) tags or wireless access point SSIDs (Service Set Identifiers) and an inventory database that stores the location of those identifiers. In addition, locations for some of the devices 3 can be identified by information stored by higher level technologies, such as information stored in applications. For example, SIP (Session Initiation Protocol) applications may store the location of their clients as well as their IP addresses. This information then can be used in order to construct the constrains for the devices 3 that run SIP clients as well as for their directly connected devices 3.

An example of an algorithm (referred to as the network management application) for estimating the locations of the devices 3 is presented. The example uses a standard 42U rack generally used in hosting facilities. The rack contains three pieces of equipment, a router (Router 1) with a public IP address, a switch (Switch) and additional router (Router 2), both with private IP addresses. The following assumptions are made:

1) The equipment is located in an IXP located in London at a given latitude and longitude.
2) Router 1 is connected to the Switch via Ethernet.
3) Router 2 is connected to the Switch via Ethernet.
4) Router 1, Router 2 and the Switch are connected such that the network management application can query all of the devices and that the correct connectivity relationships can be found.

The following algorithm can be used to determine the location of each of the devices 3.

1) The network management application queries Router 1, Switch and Router 2 and retrieves information about their physical composition in terms of ports, cards, slots, etc.
2) The network management application queries Router1, Switch and Router 2 and retrieves information about their configuration in terms of configured IP addresses, naming etc.
3) The network management application determines which IP addresses can be geocoded in the absence of specific GPS positioning hardware and DNS LOC records
4) For each IP address that can be geocoded, the network management application makes use of an appropriate technique, such as an API call. The only IP address that can be geocoded in the instance is that of Router 1, 9.196.131.x.

5) The network management application geocodes the IP address of Router 1 to the correct latitude and longitude of the hosting facility. The address information is also retrieved.

6) For the devices that cannot be geocoded (Router2 and Switch) the network management application uses its learnt topology information to determine how the devices are connected.

7) In this case, information obtained using the first through fifth rules presented above can be used (independently or in combination). Once this information is obtained, the network management application can update its network model such that Router 2 and Switch are in the same geographical location as Router1 and can, if necessary, make appropriate local co-ordinate system modifications. Let this knowledge of proximity based on the known location of one resource and the connectivity characteristics of connected devices; each of which may or may not have a resolved location, be known as a geographical set. Various techniques can be used in order to assign network devices 3 to geographical sets by utilizing the above five types of information (from the $1^{st}$ through $5^{th}$ rules, and potentially more). In general, the rules described above will provide fuzzy hints, e.g. if a device 3 is within 100 meters of another device 3, then the device 3 is likely to be in the same rack as the another device 3. Once such fuzzy geographical sets are constructed, an appropriately chosen fit function is optimized. Examples of optimization techniques for optimizing the chosen fit function are presented in step 43 of the method 40 described above.

8) If the user is satisfied with the automatically resolved location, it is cached so that subsequent network discoveries do not need to use the geocoding service, which may be charged on a per-query-basis.

9) If the user is not satisfied with the automatically resolved location, they can reassign the geographical location of a member of the geographical set to a new address or latitude and longitude and, based on learnt topology and connectivity characteristics, the network management application shall reassign the geographical location of connected network resources in the geographical set.

10) Alternatively, the user may provide all valid locations for the geographical sets (for example the geographic locations of all buildings where network devices are deployed), and the geographical sets are automatically assigned to the above locations based on a best-fit algorithm.

Finally, the location for some of the devices 3 can be located with the use of wireless signal identifiers (such as RFID tags or wireless access points SSIDs) and an inventory database that stores the location of those identifiers.

The capabilities of the present invention can be implemented in software, firmware, hardware or some combination thereof. Referring to FIG. 1, the resource locator system 20 can be implemented by resource locator software 120 in a computer processor device 3. The resource locator software 120 can also be configured in a network management application or as an add-on to other applications.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including," "having," and "has" are intended to be inclusive such that there may be additional elements other than the elements listed. The term "or" when used with a list of at least two elements is intended to mean any element or combination of elements. The terms "first" and "second" are used to distinguish elements and are not used to describe an order.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for estimating locations of devices in a network, the method comprising:

identifying each of the devices;

inputting an approximate location of at least one of the devices;

constructing a constrain for the each of the devices, the constrain comprising a type of connectivity of the device;

deriving an optimization criterion on a location for the each of the devices, the optimization criterion assigning a positive weight to each of the constrain for the each of the devices that is satisfied by at least one of an estimated location and the approximate location and assigning a negative weight to each of the constrain for the each of the devices that is not satisfied by at least one of the estimated location and the approximate location;

calculating by a processor a best fit location for the each of the devices that maximizes the optimization criterion;

presenting the best fit location for the each of the devices to a user, the user either accepting or rejecting each of the best fit location, the user providing additional information for constructing the each of the constrain for the each of the devices associated with the best fit location rejected; and iterating the identifying, the inputting, the constructing, the deriving, the calculating, and the presenting using the additional information until the user accepts the each of the best fit location for the each of the devices.

* * * * *